INVENTOR:
MAYNARD HERMAN,
BY William Freedman
ATTORNEY.

United States Patent Office 3,110,530
Patented Nov. 12, 1963

---

3,110,530
SELF-LUBRICATING SLEEVE BEARING
Maynard Herman, Glassboro, N.J., assignor to General Electric Company, a corporation of New York
Filed Jan. 16, 1962, Ser. No. 166,649
5 Claims. (Cl. 308—238)

This invention relates to a self-lubricating sleeve bearing and, more particularly, to a bearing of this type which relies upon fluorocarbon fibers for providing the low friction working face of the bearing.

Fibers made of fluorocarbon resins, such as tetrafluoroethylene, which is a material sold under the trademark Teflon, have found increasing use as bearing materials. Bearing surfaces made of these fibers have a low coefficient of friction and, under light loads, have a high degree of resistance to wear and abrasion, even in the absence of external lubrication. But prior sleeve bearings of this type that I am aware of have, in most cases, been relatively expensive and have also been subject to the disadvantage that they deform or wear excessively under heavy unit loadings, e.g., 10,000 to 20,000 p.s.i. More specifically, there has been a tendency for the fluorocarbon fibers to cold flow or to be otherwise displaced under the prolonged influence of these heavy unit loadings and to be forced out of the ends of the bearings. This has resulted in excessive clearance developing between the journal and the bearing.

Accordingly, an object of my invention is to provide an inexpensive sleeve bearing of this general type that has an exceptionally high resistance to deformation under high unit loadings.

In carrying out my invention in one form, I provide a sleeve bearing of tubular configuration having a cylindrical outer surface and a cylindrical inner surface disposed in generally concentric relationship. The bearing comprises an inner layer formed of interlacing strands of yarn woven into a seamless cylinder and disposed at said cylindrical inner surface. At least some of the strands each comprise a plurality of filaments of resin-bondable material, such as cotton, and a plurality of filaments of fluorocarbon resin, such as tetrafluoroethylene, twisted together in such a manner that the resin-bondable filaments are dispersed throughout the cross section of the strand. The bearing further comprises a backing for this layer of yarn composed of a thermosetting resin bonded to the filaments of resin-bondable material and extending through said layer of yarn to said cylindrical inner surface so as to provide support for said strands against displacement under load. The resin substantially fills the spaces between the strands of yarn in the woven layer. Reinforcing fibers, preferably of glass, are imbedded in the thermosetting resin, for resisting deformation of the backing under load.

For a better understanding of my invention, reference may be had to the following description taken in conjunction with the accompanying drawings, wherein.

Figure 1:
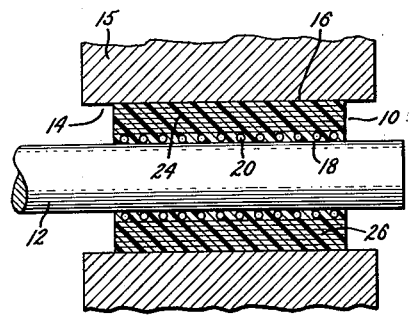
FIG. 1 is a cross sectional view through a sleeve bearing embodying one form of my invention.

Referring now to FIG. 1, there is shown a sleeve bearing 10 for supporting a metallic journal 12 for rotary or oscillatory motion within the bearing. The bearing 10 is press-fitted within a cylindrical bore 14 formed in a stationary housing 15 so that it remains stationary while the journal 12 turns therein about its longitudinal axis.

Figure 2:
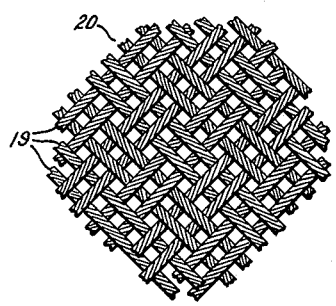
FIG. 2 is an enlarged view of a portion of the inner layer of the bearing of FIG. 1.
Figure 3:
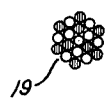
FIG. 3 is an enlarged cross-sectional view of the strands of yarn used in the inner layer of FIG. 2.

The sleeve bearing 10 has a cylindrical outer surface 16 of uniform diameter and a cylindrical inner surface 18 also of uniform diameter disposed concentrically with respect to the outer surface. At the inner surface 18 there is a cylindrical liner 20 woven from strands 19 of yarn containing fluorocarbon fibers or filaments. These filaments are preferably of tetrafluoroethylene, a material sold under the trademark Teflon. The strands 19 can best be seen in FIG. 2, which is an enlarged view of the woven inner layer 20 flattened out for illustration purposes. Each strand 19 of yarn contains a plurality of these Teflon filaments and a plurality of filaments of a resin-bondable material such as cotton. The cotton filaments and the Teflon filaments are twisted together along their length, or stated otherwise, are twisted together about the longitudinal axis of said strand, so that a transverse cross section through each strand of yarn reveals cotton filaments dispersed throughout the cross section of the strand. Such a cross section, enlarged and simplified, is depicted in FIG. 3, where the Teflon filaments are shown shaded and the cotton filaments are shown unshaded. The purpose of the cotton filaments is to provide intimate support for the Teflon filaments along their entire length so as to provide increased resistance to displacement under heavy loads. This supporting function will be described in greater detail hereinafter.

The inner liner 20 is formed by weaving the strands of yarn of the liner about a suitable mandrel (not shown) to produce a seamless sleeve surrounding the mandrel. Many different types of weaves can be used for this application, but I prefer to use the braid type weave shown in FIG. 2. Although many of the details of the weave are not important, it is important that there be some interlacing of the strands of yarn, as shown in FIG. 2, so that there are strands available to resist distortion of the liner in a direction parallel to its longitudinal axis. Liners formed by winding a single strand of yarn in a helical pattern along the axis of the mandrel with no interlacing strands available to resist such longitudinal distortion are preferably not used in practising the present invention. The weave used in forming the liners is preferably a rather loose one, so that there are spaces available between the yarns which can be filled with the resin that forms the backing for the liner 20.

This backing for the liner 20 is shown at 24. It is made of a thermosetting resin, preferably an epoxy resin, which is a hard material reinforced with high strength fibers 26, preferably of glass. The preferred method of incorporating this backing involves, first, weaving about the inner liner one or more layers of glass fibers; then impregnating the entire system with the thermosetting resin while the resin is in a liquid state, preferably, by vacuum impregnation; and then removing the impregnated system and curing the resin by a suitable curing process to render it rigid, or hard. The weaving of the glass fibers about the inner sleeve and the impregnation and curing steps can all be performed while the inner sleeve is on the mandrel about which it was originally woven.

The impregnation step should be performed in such a manner that it produces a thorough penetration of the inner liner by the resin and results in the resin filling the spaces between the strands of yarn forming the inner liner 20. After hardening, the resin in these spaces contributes in an important manner by preventing displacement of the yarn under subsequently-applied loads. The Teflon filaments do not chemically bond to the resin because of Teflon's inherent resistance to bonding, but the cotton filaments are readily bonded to the resin. Since the cotton filaments are twisted together with the Teflon filaments and are dispersed throughout the cross section of each strand of yarn, the bond between the cotton filaments and the resin also contributes in an important manner to anchoring the Teflon filaments against displacement under subsequently-applied loads.

It is desirable that at least some of the glass fibers 20 used in the backing material run longitudinally of the sleeve bearing so as to provide increased resistance to longitudinal deformation. It is also desirable that there be some interlacing of the glass fibers at least at the outer periphery of the unimpregnated system so as to facilitate handling of the system prior to impregnation. This interlacing can be effected by a braid weave such as shown in FIG. 2.

Journal bearings of the design described hereinabove have been tested under various load conditions. In one type of test performed with no external lubrication, a one-half inch diameter journal corresponding to that shown at 12 was operated through intermittent oscillations of 90° each while being subjected to a load that resulted in a unit loading on the bearing of 20,000 p.s.i. After 10,000 oscillations, the total enlargement in diametrical clearance between the bearing and the journal was only about .003 to .004 inch. Other bearings using Teflon fibers were also tested but with significantly inferior results. One group of these bearings had a liner made of a double fabric, the exposed face of which was of pure Teflon fibers and the back face of cotton fibers. This fabric was bonded with a suitable adhesive to a metal backing. After 5,000 operations at 10,000 p.s.i., these bearings showed a deformation of .007 to .010 inch. Another group of the bearings tested was made of Teflon fabric rolled into several concentric layers held together with a thermoplastic resin between the layers. These bearings showed deformations of .010 to .020 inch after a few thousand operations at a few thousand p.s.i.

Spherical bearings made by the first of these latter two techniques have been found to have deformations comparable to those obtained with my sleeve bearings, but a spherical bearing cannot be fairly compared with a sleeve bearing because the spherical configuration of the surrounding parts restrains the bearing material against the longitudinal flow and displacement which is responsible for the high deformations encountered with sleeve bearings. It should also be noted that spherical bearings are many times more expensive than sleeve bearings of the type described hereinabove.

The bearing described hereinabove has only a single layer of cotton-Teflon yarn constituting its liner. Tests made with bearings in which this liner is made of more than one such layer have shown that the deformations occurring with such bearings are in the acceptable range, but they are slightly greater than those occurring with the single layer of cotton-Teflon under corresponding test conditions. No perceptible improvements were obtained with the added layer of cotton-Teflon yarn, but the cost of the bearing was increased. Thus, I prefer to use only a single layer of the cotton-Teflon material.

Figure 4:
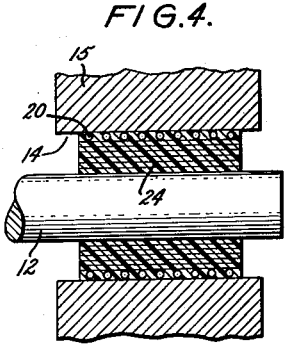
FIG. 4 shows a modified form of sleeve bearing.

Although my invention has been particularly described in connection with cylindrical sleeve bearings that have their working faces located at their internal peripheries, it is also applicable to cylindrical sleeve bearings that have their working faces on their external peripheries. This latter class of bearings is made by first weaving the glass or other reinforcing fibers for the backing about a mandrel corresponding to that described above and then weaving the cotton-Teflon fibers about the glass fibers. The assembly is then impregnated with a thermosetting resin and thereafter cured in the same general manner as described hereinabove. Such a bearing is shown in FIG. 4 where the layer forming the working face of the bearing is designated 20 and the backing for this layer is designated 24. The bearing is pressed onto a shaft 12 and rotates with the shaft inside the bore 14 of a metallic housing 15.

Figure 5:
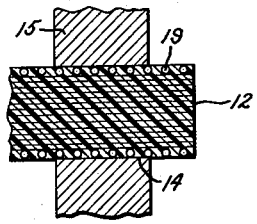
FIG. 5 is a cross sectional view of still another modification.

Another modification similar to that of FIG. 4 is shown in FIG. 5. Here, the cotton-Teflon fiber 19 is woven about a shaft 12 that serves as a mandrel during the fabrication process. This shaft 12 is preferably of a glass-reinforced epoxy resin in a form sometimes referred to in the art as fish-rod stock. After the layer of cotton-Teflon yarn is in position, it is impregnated with a suitable thermosetting resin of a type compatible with the material of the mandrel or shaft 12. The impregnation is of such a nature that the thermosetting resin thoroughly penetrates the layer of cotton-Teflon yarn and fills all the spaces between the strands and between the strands and the mandrel 12. Thus, a strong bond is effected between the adjacent strands and between the mandrel and the strands. The completed assembly is adapted to rotate within the bore 14 of a metallic housing 15 in the same manner as described in connection with FIG. 5.

While I have shown and described particular embodiments of my invention, it will be obvious to those skilled in the art that various changes and modifications may be made without departing from my invention in its broader aspects, and I, therefore, intend in the appended claims to cover all such changes and modifications as fall within the true spirit and scope of my invention.

What I claim as new and desire to secure by Letters Patent of the United States is:

1. A sleeve bearing of tubular configuration having a cylindrical outer surface and a cylindrical inner surface disposed in generally concentric relationship, said bearing comprising an inner liner formed of interlacing strands of yarn woven into a seamless cylinder disposed at said cylindrical inner surface, at least some of said strands each comprising a plurality of filaments of resin-bondable material and a plurality of filaments of fluorocarbon resin twisted together about the longitudinal axis of said strand in such a manner that the filaments of resin-bondable material are dispersed throughout the cross section of the strand, a hard backing for said liner composed of a hard thermosetting epoxy resin bonded to said filaments of resin-bondable material and extending through said liner to said cylindrical inner surface so as to support said strands against displacement under load, some of said filaments of fluorocarbon resin being exposed at said cylindrical inner surface, said resin substantially filling the spaces between the strands of yarn in said woven liner, and glass reinforcing fibers imbedded in said thermosetting resin for resisting deformation of the backing under load, said glass reinforcing fibers and said hard thermosetting resin constituting the only materials contained in said backing, and said inner liner comprising only a single layer of yarn containing said filaments of fluorocarbon resin and resin-bondable material, with no intermediaries interposed between said backing and said single layer.

2. The bearing of claim 1 in which said fluorocarbon resin is tetrafluoroethylene.

3. The bearing of claim 1 in which said resin-bondable material is cotton and said fluorocarbon resin is tetrafluoroethylene.

4. A sleeve bearing of tubular configuration having a cylindrical outer surface and a cylindrical inner surface disposed in generally concentric relationship, said bearing comprising a layer at one of said cylindrical surfaces formed of interlacing strands of yarn woven into a seamless cylinder, at least some of said strands each comprising a plurality of filaments of a resin-bondable material and a plurality of filaments of fluorocarbon resin twisted together about the longitudinal axis of said strand in such a manner that the filaments of resin-bondable material are dispersed throughout the cross section of the strand, a hard backing for said layer of yarn composed of a hard thermosetting epoxy resin bonded to said filaments of resin-bondable material and extending through said layer of yarn to said one cylindrical surface so as to support said yarn against displacement under load, some of said filaments of fluorocarbon resin being exposed at said one cylindrical surface, said resin substantially filling the spaces between the strands of yarn in said woven layer, and glass reinforcing fibers imbedded in said thermosetting resin for resisting deformation of the backing under load, said glass reinforcing fibers and said hard thermosetting resin constituting the only materials contained in said backing, and said seamless cylinder being constituted by only a single layer of yarn containing said filaments of fluorocarbon resin and resin-bondable material, with no intermediaries interposed between said single layer and said backing.

5. A bearing having a cylindrical outer surface constituting the working surface of the bearing, said bearing comprising a layer at said cylindrical outer surface formed of interlacing strands of yarn woven into a seamless cylinder, at least some of said strands each comprising a plurality of filaments of a resin-bondable material and a plurality of filaments of fluorocarbon resin twisted together about the longitudinal axis of said strand in such a manner that the filaments of resin-bondable materials are dispersed throughout the cross section of the strand, a hard backing for said layer of yarn composed of a hard thermosetting epoxy resin bonded to said filaments of resin-bondable material and extending through said layer of yarn to said cylindrical outer surface so as to support said yarn against displacement under load, some of said filaments of said fluorocarbon resin being exposed at said outer surface, said resin substantially filling the spaces between the strands of yarn in said woven layer, and glass reinforcing fibers imbedded in said thermosetting resin for resisting deformation of the backing under load, said glass reinforcing fibers and said hard thermosetting resin constituting the only materials contained in said backing, and said seamless cylinder being constituted by only a single layer of yarn containing said fluorocarbon resin and resin-bondable material, with no intermediaries interposed between said backing and said single layer.

References Cited in the file of this patent

UNITED STATES PATENTS

| | | |
|---|---|---|
| 2,322,771 | Palm et al. | June 29, 1943 |
| 2,804,886 | White | Sept. 3, 1957 |
| 2,906,569 | Runton et al. | Sept. 29, 1959 |
| 2,910,329 | Runton | Oct. 27, 1959 |
| 3,037,893 | White | June 5, 1962 |

FOREIGN PATENTS

| | | |
|---|---|---|
| 596,265 | Canada | Apr. 12, 1960 |